(12) United States Patent
Itou

(10) Patent No.: US 11,245,128 B2
(45) Date of Patent: Feb. 8, 2022

(54) FUEL CELL UNIT

(71) Applicant: TOYOTA JIDOSHA KABUSHIKI KAISHA, Toyota (JP)

(72) Inventor: Masayuki Itou, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 31 days.

(21) Appl. No.: 16/896,619

(22) Filed: Jun. 9, 2020

(65) Prior Publication Data

US 2021/0043960 A1    Feb. 11, 2021

(30) Foreign Application Priority Data

Aug. 9, 2019    (JP) .............................. JP2019-147424

(51) Int. Cl.
  *H01M 8/2475*    (2016.01)
  *H01M 8/04828*   (2016.01)
  *H01M 8/249*     (2016.01)

(52) U.S. Cl.
  CPC ....... *H01M 8/2475* (2013.01); *H01M 8/0494* (2013.01); *H01M 8/249* (2013.01); *H01M 2250/20* (2013.01)

(58) Field of Classification Search
  None
  See application file for complete search history.

(56) References Cited

U.S. PATENT DOCUMENTS

| | | | |
|---|---|---|---|
| 2007/0254193 A1* | 11/2007 | Lam ......................... | H02J 7/34 |
| | | | 429/431 |
| 2018/0272889 A1 | 9/2018 | Nakamura et al. | |
| 2020/0388872 A1* | 12/2020 | Itou ..................... | H01M 8/0491 |
| 2021/0043961 A1* | 2/2021 | Itou ..................... | H01M 8/2475 |

FOREIGN PATENT DOCUMENTS

| | | |
|---|---|---|
| JP | 2017-073199 | 4/2017 |
| JP | 2018-163846 | 10/2018 |

* cited by examiner

*Primary Examiner* — Alix E Eggerding
(74) *Attorney, Agent, or Firm* — Finnegan, Henderson, Farabow, Garrett & Dunner, LLP

(57) ABSTRACT

A second flange is separated from at least one of ribs located at one end and the other end out of a plurality of ribs of a plurality of first cases which are located next to each other in a second direction, and is fixed to one of the ribs except for the at least one of the ribs.

6 Claims, 6 Drawing Sheets

FUEL CELL UNIT

INCORPORATION BY REFERENCE

The disclosure of Japanese Patent Application No. 2019-147424 filed on Aug. 9, 2019 including the specification, drawings and abstract is incorporated herein by reference in its entirety.

BACKGROUND

1. Technical Field

The disclosure relates to fuel cell units.

2. Description of Related Art

There are cases where a fuel cell stack is integrated with a power converter for converting electric power of the fuel cell stack by fixing a case accommodating the power converter to a case accommodating the fuel cell stack with the fuel cell stack being electrically connected to the power converter (e.g., Japanese Patent Application Publication No. 2017-073199).

SUMMARY

The case accommodating the fuel cell stack has an opening so that a conductive member that electrically connects the fuel cell stack and the power converter can extend through the opening. The fuel cell stack has a stack in which a plurality of single cells are stacked. In order to obtain, e.g., satisfactory electrical connection between the single cells, a compressive load is applied by the case to the stack in the direction in which the single cells are stacked. This compressive load therefore acts as a tensile load on the case accommodating the fuel cell stack. In other words, this case has a function to retain the compressive load applied to the stack. It is therefore desired that the case have high rigidity. However, since such a case has an opening as described above, the case may have reduced rigidity. When the case has reduced rigidity, a sufficient compressive load may not be applied to the stack.

The number of stacked single cells can be increased in order to ensure output power. As the number of stacked single cells increases, the overall weight of the stack increases accordingly, and the single cells may be more likely to be displaced from each other when an external impact etc. is applied to the stack in a direction crossing the direction in which the single cells are stacked. In order also to prevent such displacement of the single cells, it is desirable to apply a sufficient compressive load to the stack. However, when the case has reduced rigidity, a sufficient compressive load may not be applied to the stack as described above. One possible solution is to integrate a plurality of fuel cell stacks with the power converter rather than increasing the number of stacked single cells of a single fuel cell stack. In this case, the overall device size may be increased when the case accommodating the power converter is fixed to cases accommodating the fuel cell stacks.

The disclosure provides a fuel cell unit in which a case accommodating a fuel cell stack has sufficient rigidity and which has a reduced size while ensuring output power.

Such a fuel cell unit is achieved by a fuel cell unit including: a plurality of fuel cell stacks; a plurality of first cases each accommodating a corresponding one of the fuel cell stacks; a power converter that converts electric power of the fuel cell stacks; a second case accommodating the power converter and fixed to the first cases; and a conductive member unit that electrically connects the fuel cell stacks to the power converter in the first cases and the second case, wherein each of the fuel cell stacks includes a stack including a plurality of single cells stacked in a first direction, the stack is subjected to a compressive load in the first direction applied by a corresponding one of the first cases, each of the first cases includes a wall facing the second case, a first flange projecting from the wall toward the second case, and a first opening formed in the wall so as to be surrounded by the first flange, the second case includes a second flange fixed to the first flanges of the first cases so as to surround the first openings of the first cases, and a second opening formed so as to be surrounded by the second flange and communicating with the first openings, the conductive member unit extends from each of the first openings through the second opening into the second case, each of the first flanges includes at least three ribs extending in the first direction and located next to each other in a second direction crossing the first direction, the first cases are arranged such that the at least three ribs of each of the first cases extend in the first direction and are located next to each other in the second direction, a length of the second case in the second direction is smaller than an overall length of the first cases in the second direction, and the second flange is separated from at least one of the ribs located at a first end and a second end out of the at least three ribs of the first cases which are located next to each other in the second direction, and is fixed to two of the at least three ribs except for the at least one of the ribs. In this specification, the power converter may be a converter or an inverter.

The at least three ribs may include at least four ribs. The second flange may be separated from both of the ribs located at the first end and the second end out of the at least four ribs of the first cases which are located next to each other in the second direction, and may be fixed to two of the at least four ribs except for the both of the ribs.

The second flange may be fixed to the rib located closest to the first opening in at least one of the first cases.

The stack may include first and second terminal plates between which the single cells are sandwiched and that are separated from each other in the first direction. The first opening may have a shape that is longer in the first direction than in the second direction. The conductive member unit may include first and second conductive members connected to the first and second terminal plates through the first opening, respectively.

The second case may include a plurality of the second flanges each fixed to a corresponding one of the first flanges of the first cases, and a plurality of the second openings each surrounded by a corresponding one of the second flanges.

The second case may include a tub-shaped body and a lid fixed to the tub-shaped body. The tub-shaped body may include a third flange and a third opening surrounded by the third flange. The lid may include the second flanges, the second openings, a fourth flange fixed to the third flange, and a fourth opening surrounded by the fourth flange. Each of the third and fourth flanges may be larger than the second flange.

The disclosure thus provides a fuel cell unit in which a case accommodating a fuel cell stack has sufficient rigidity and which has a reduced size while ensuring output power.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

General Configuration of Fuel Cell Unit 1

Figure 1:
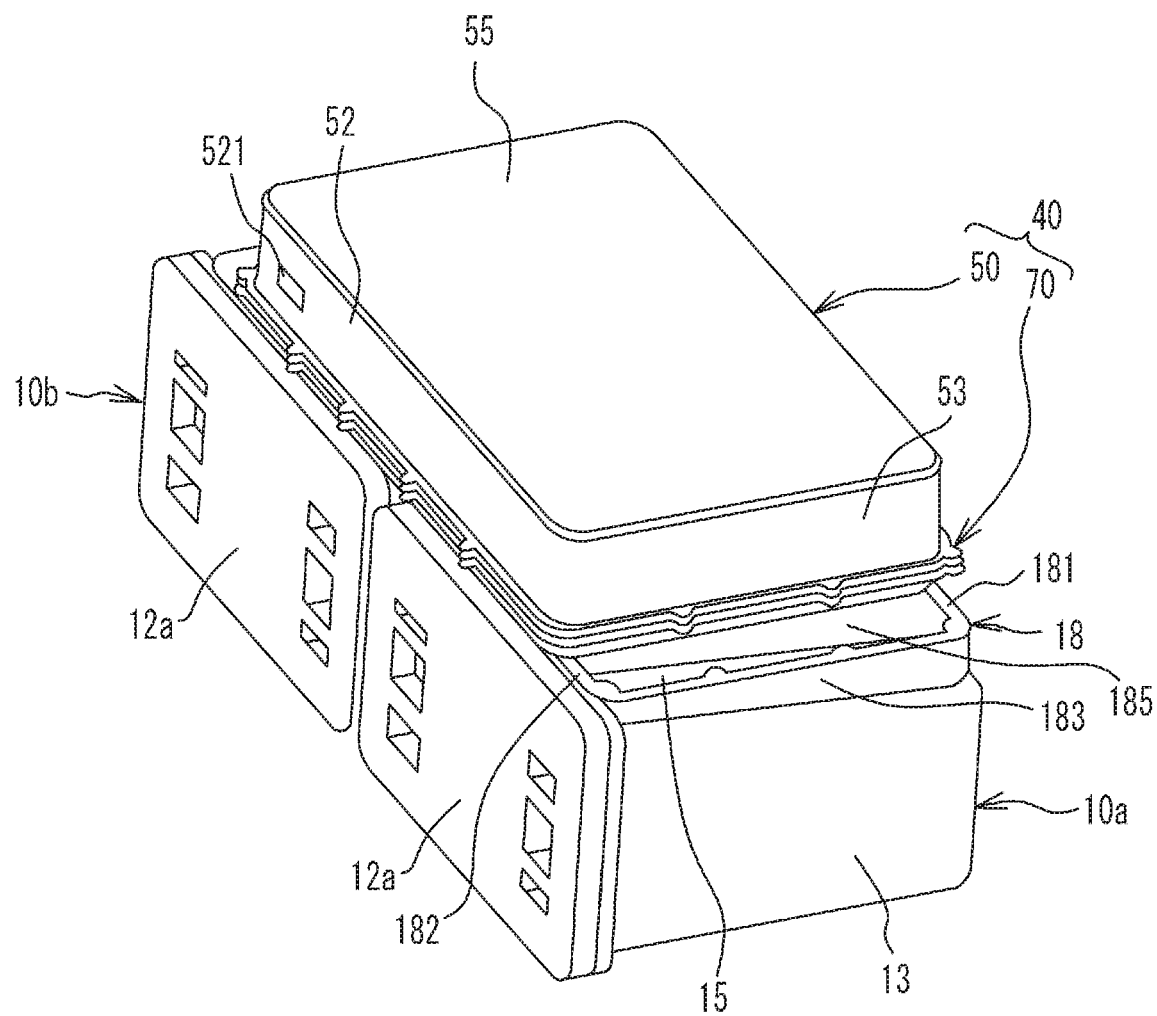
FIG. 1 is a perspective view of a fuel cell unit.
Figure 2:
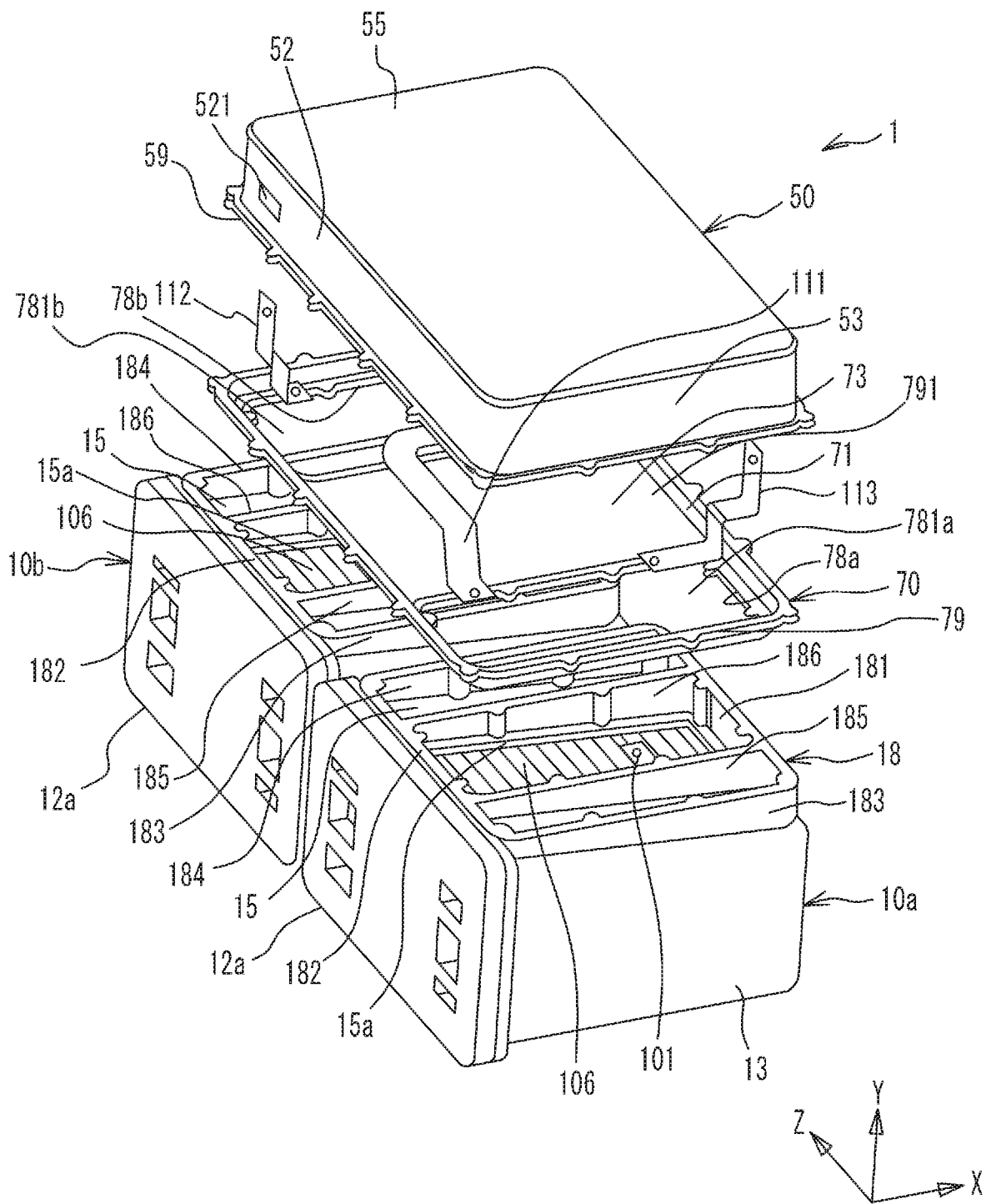
FIG. 2 is an exploded perspective view of the fuel cell unit.
Figure 3:
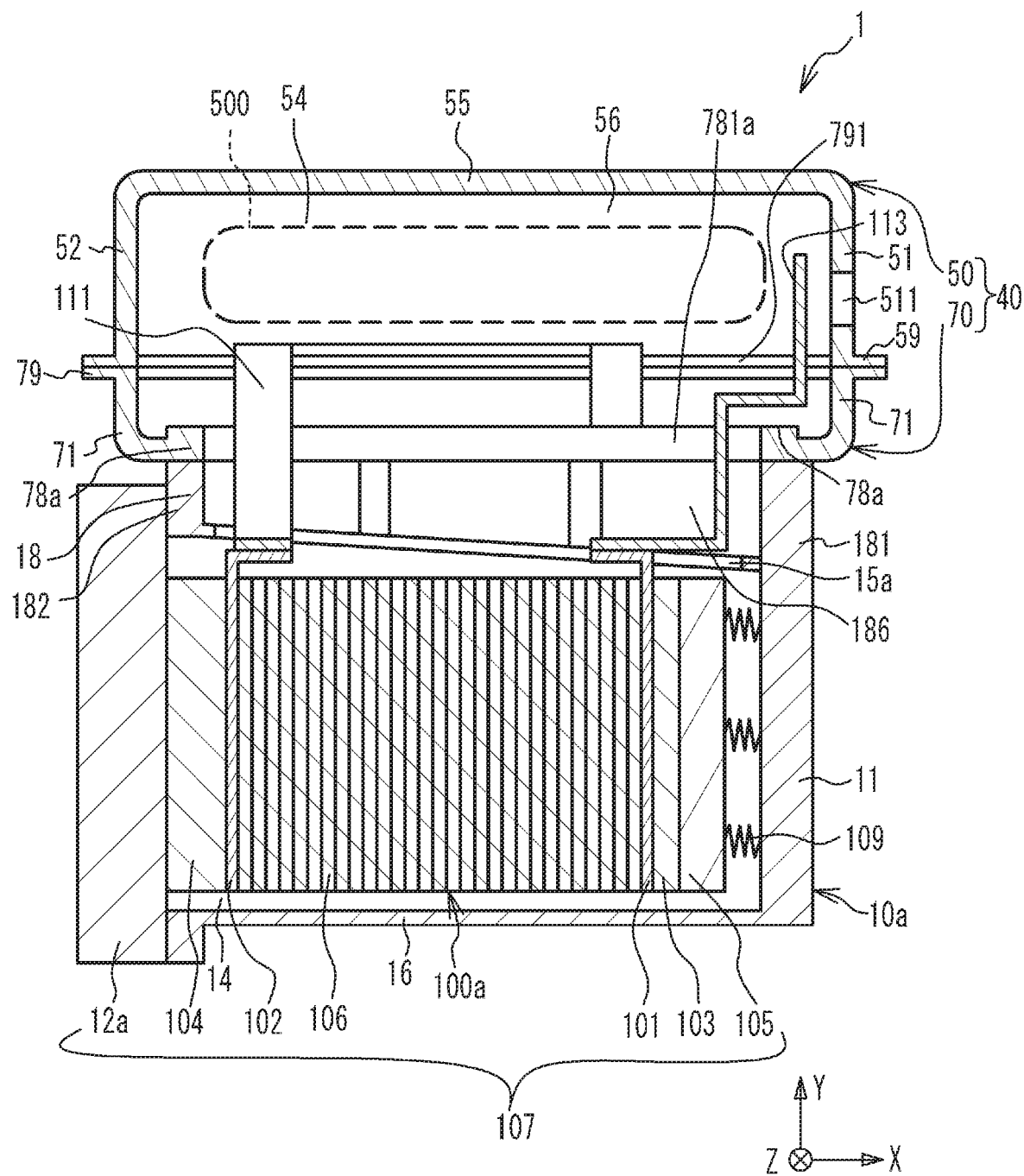
FIG. 3 is a sectional view of the fuel cell unit.
Figure 4:
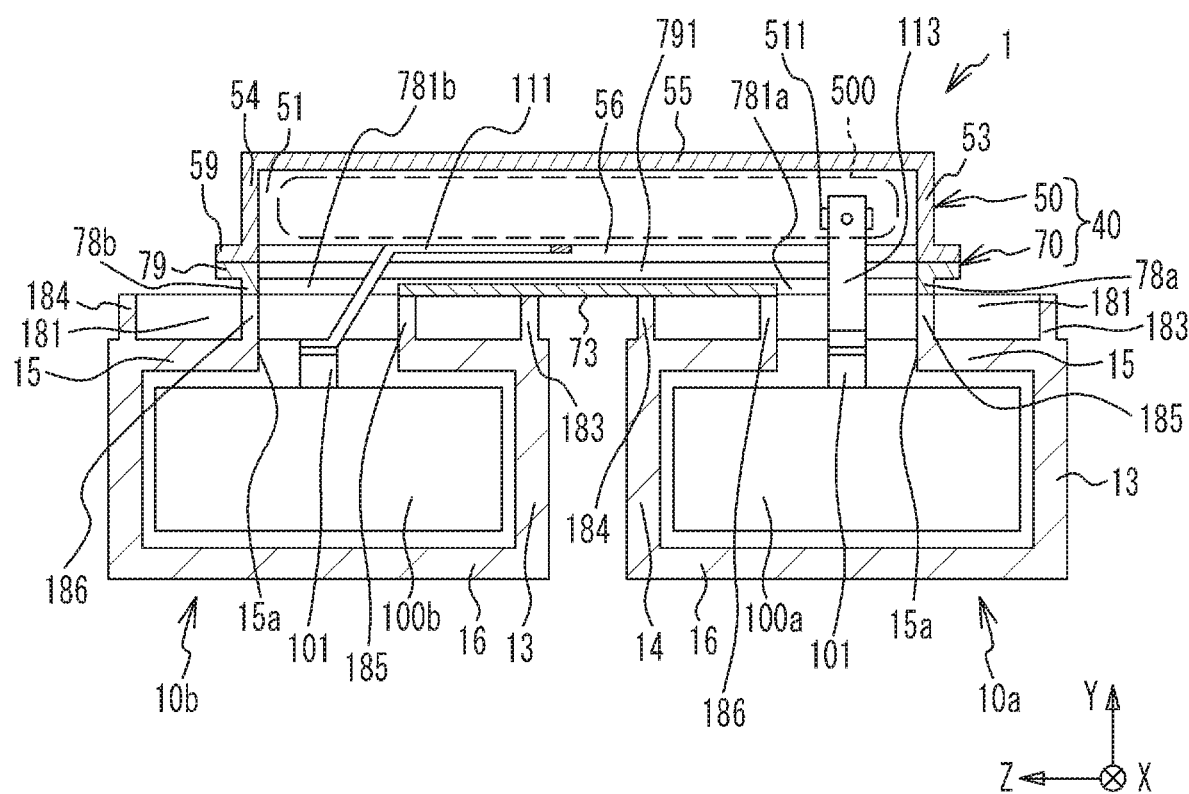
FIG. 4 is a sectional view of the fuel cell unit.

FIG. 1 is a perspective view of a fuel cell unit 1. FIG. 2 is an exploded perspective view of the fuel cell unit 1. FIGS. 3 and 4 are sectional views of the fuel cell unit 1. The fuel cell unit 1 includes two stack cases 10a, 10b, fuel cell stacks 100a, 100b, a boost converter 500, and a converter case 40. The fuel cell stacks 100a, 100b are accommodated in the stack cases 10a, 10b, respectively. The boost converter 500 is electrically connected to the fuel cell stacks 100a, 100b. The boost converter 500 is accommodated in the converter case 40. As described in detail later, the converter case 40 includes a body 50 and a lid 70. An X direction, a Y direction, and a Z direction that are orthogonal to each other are shown in the figures. The Z direction is an example of a direction in which the stack cases 10a, 10b are arranged next to each other. As described in detail later, the X direction is an example of a direction in which single cells 106 of each fuel cell stack 100a, 100b are stacked. The two stack cases 10a, 10b and the converter case 40 overlap in the Z direction. FIG. 3 illustrate a section of the fuel cell unit 1 parallel to the XY plane. FIG. 4 illustrates a section of the fuel cell unit 1 parallel to the YZ plane. In FIGS. 3 and 4, the boost converter 500 is illustrated in a simplified manner by dashed line.

The stack cases 10a, 10b are the same members, but are denoted by different reference signs for convenience. The fuel cell stacks 100a, 100b are also the same members, but are denoted by different reference signs for convenience. The boost converter 500 accommodated in the converter case 40 boosts the output voltage of the fuel cell stacks 100a, 100b and outputs the boosted voltage to an external device. The boost converter 500 is an example of the power converter that converts the output power of the fuel cell stacks 100a, 100b. The power converter is not limited to the boost converter and may be any of a buck converter, a buck boost converter that can serve as both a boost converter and a buck converter, and an inverter that converts DC power to AC power. The power converter may be the other converter or inverter. Since the fuel cell unit 1 includes the two fuel cell stacks 100a, 100b, output power is ensured.

General Configuration of Stack Cases 10a, 10b

The stack case 10a is made of a highly rigid material like a metal material such as an aluminum alloy. The stack case 10a includes side walls 11, 13, and 14, an upper wall 15, and a bottom wall 16. The side wall 11 is parallel to the YZ plane. The side walls 13, 14 are separated from each other in the Z direction and are substantially parallel to the XY plane. The upper wall 15 and the bottom wall 16 are separated from each other in the Y direction. The bottom wall 16 is parallel to the XZ plane, but the upper wall 15 is tilted with respect to the XZ plane as described in detail later. The stack case 10a has an opening rather than a wall at a position facing the side wall 11 in the −X direction. An end plate 12a, described later, is fixed to the stack case 10a by bolts, not shown, so as to close the opening. Like the side wall 11, the end plate 12a is parallel to the YZ plane. The upper wall 15 is actually tilted with respect to the XZ plane such that the end on the end plate 12a side of the upper wall 15 is located higher in the Y direction than the end on the side wall 11 side of the upper wall 15. However, the disclosure is not limited to this.

Similarly, the stack case 10b includes side walls 11, 13, and 14, an upper wall 15, and a bottom wall 16, and an end plate 12a is fixed to the stack case 10b. As shown in FIGS. 1, 2, and 4, the stack cases 10a, 10b and the converter case 40 are fixed together such that the side wall 14 of the stack case 10a and the side wall 13 of the stack case 10b face each other and the end plates 12a fixed to the stack cases 10a, 10b face the same direction. The stack cases 10a, 10b are an example of the plurality of first cases.

Detailed Configuration of Flange 18

Each of the stack cases 10a, 10b has a flange 18 on the upper wall 15. The flange 18 projects in the +Y direction from the upper wall 15 and has a predetermined height from the upper wall 15 in the +Y direction. In other words, the flange 18 projects toward the converter case 40. The upper end face of the flange 18 is parallel to the XZ plane. The flange 18 includes lateral ribs 181, 182, outer longitudinal ribs 183, 184, and inner longitudinal ribs 185, 186. The lateral ribs 181, 182 extend in the Z direction and are separated from each other in the X direction. The outer longitudinal ribs 183, 184 extend in the X direction and are separated from each other in the Z direction. The outer longitudinal rib 183 is continuous with one end of the lateral rib 181 and one end of the lateral rib 182. The outer longitudinal rib 184 is continuous with the other end of the lateral rib 181 and the other end of the lateral rib 182. The lateral rib 181, the lateral rib 182, the outer longitudinal rib 183, and the outer longitudinal rib 184 are located near the side wall 11, the end plate 12a, the side wall 13, and the side wall 14, respectively.

The inner longitudinal ribs 185, 186 are located between the outer longitudinal ribs 183, 184 and extend in the X direction like the outer longitudinal ribs 183, 184. The inner longitudinal ribs 185, 186 are continuous with the lateral ribs 181, 182. The inner longitudinal ribs 185, 186 are continuous with the outer longitudinal ribs 183, 184 via the lateral ribs 181, 182. The outer longitudinal rib 183, the inner longitudinal rib 185, the inner longitudinal rib 186, and the outer longitudinal rib 184 are located next to each other in this order in +Z direction. Each of the ribs such as the lateral ribs 181 is shaped as follows. Each of the ribs projects in the +Y direction from the upper wall 15 and has a predetermined height from the upper wall 15 in the +Y direction. Each of the ribs extend in a predetermined direction on the upper wall 15, and the thickness of each rib in a direction perpendicular to the direction in which the rib extends is smaller than the length of the rib in the direction in which the rib extends. The stack cases 10a, 10b are disposed such that the outer longitudinal ribs 183, 184 and the inner longitudinal ribs 185, 186 of each flange 18 extend in the X direction and are located next to each other in the Z direction. The flange 18 is an example of the first flange.

The flange 18 is an inward flange having a plurality of protrusions that protrude inward from the inner side surface of the flange 18 and are substantially evenly spaced apart in the circumferential direction of the flange 18. Each of the protrusions has an internally threaded hole, not shown. Specifically, each of the lateral ribs 181, 182 and the outer longitudinal ribs 183, 184 has a plurality of protrusions that protrude inward from its inner side surface. Each of the inner longitudinal ribs 185, 186 also has a plurality of protrusions. The protrusions of each of the inner longitudinal ribs 185, 186 protrude inward, namely toward the other inner longitudinal rib 185, 186, from its inner surface in the region surrounded by the inner longitudinal ribs 185, 186 and the lateral ribs 181, 182.

The upper wall 15 has an opening 15a surrounded by the flange 18. Specifically, the upper wall 15 has the opening 15a between the inner longitudinal ribs 185, 186. The opening 15a is longer in the X direction than in the Z direction. In FIG. 2, a terminal plate 101 and a plurality of single cells 106 which form a part of the fuel cell stack 100a are exposed from the opening 15a. The opening 15a is an example of the first opening. An insulating sheet etc. may be provided between the single cells 106 and the opening 15a so that the single cells 106 are not directly exposed from the opening 15a.

General Configuration of Fuel Cell Stacks 100a, 100b

As shown in FIG. 3, the fuel cell stack 100a includes a stack 107 in which a plurality of plate-like members are stacked. Specifically, the stack 107 includes the plurality of single cells 106, the terminal plate 101, an insulator 103, a pressure plate 105, a terminal plate 102, an insulator 104, and the end plate 12a. The plurality of single cells 106 are stacked in the X direction. The terminal plate 101, the insulator 103, and the pressure plate 105 are disposed on one end side of the plurality of single cells 106 and stacked in this order on the one end of the plurality of single cells 106. The terminal plate 102, the insulator 104, and the end plate 12a are disposed on the other end side of the plurality of single cells 106 and stacked in this order on the other end of the plurality of single cells 106. Since the pressure plate 105 is biased toward the end plate 12a by a spring 109 disposed between the pressure plate 105 and the side wall 11, and the end plate 12a is fixed to the stack case 10a, a compressive load in the X direction is applied to the stack 107. The stack 107 is thus subjected to a compressive load in the X direction applied by the stack case 10a via the spring 109.

The single cell 106 is a polymer electrolyte fuel cell that is supplied with oxidant gas and fuel gas to generate electric power. The oxidant gas is air containing oxygen, and the fuel gas is hydrogen gas. The single cell 106 includes a membrane electrode assembly and a pair of separators sandwiching the membrane electrode assembly therebetween. The membrane electrode assembly is a power generator composed of an electrolyte membrane and electrodes disposed on both sides of the electrolyte membrane. The electrolyte membrane is a solid polymer membrane that is made of a hydrocarbon resin material having a sulfonate group or fluororesin material having a sulfonate group. The electrolyte membrane exhibits satisfactory proton conductivity when in a wet state. Each of the electrodes include a carbon support and an ionomer that is a solid polymer having a sulfonate group and that exhibits satisfactory proton conductivity when in a wet state. A catalyst for facilitating a power generation reaction (e.g., platinum, a platinum-cobalt alloy, etc.) is supported on the carbon support. Each of the separators is a thin plate-like member made of a conductive material having gas barrier properties, namely made of a metal such as press-formed stainless steel, titanium, or a titanium alloy.

The terminal plates 101, 102 are plates made of a conductive material like a metal such as copper, aluminum, or an alloy containing copper and aluminum, or dense carbon. The insulators 103, 104 are plates made of an insulating material such as rubber or resin. The end plate 12a and the pressure plate 105 are made of a highly rigid material like a metal material such as stainless steel or an aluminum alloy. The end plate 12a has supply holes and discharge holes for supplying and discharging the oxidant gas, the fuel gas, and cooling water to and from the fuel cell stack 100a. Supply pipes and discharge pipes are connected to the supply holes and the discharge holes.

In the fuel cell unit 1, both of the end plates 12a of the stack cases 10a, 10b are disposed on the same side, the supply and discharge pipes for supplying and discharging the oxidant gas, the fuel gas, and the cooling water, which are connected to the end plates 12a, can be disposed on the same side with respect to the fuel cell unit 1. The fuel cell unit 1 thus has improved mountability.

As shown in FIG. 3, each of the terminal plates 101, 102 of the fuel cell stack 100a has a projecting portion that projects beyond the plurality of single cells 106 in the +Y direction and that is exposed from the opening 15a. As shown in FIGS. 2, 3, and 4, the plurality of single cells 106 of each fuel cell stack 100a, 100b are electrically connected to the boost converter 500 by the terminal plates 101, 102, a relay bus bar 111, connection bus bars 112, 113. The relay bus bar 111 and the connection bus bars 112, 113 are made of a metal having low electrical resistivity such as copper, aluminum, or an alloy containing copper and aluminum. That is, the relay bus bar 111 and the connection bus bars 112, 113 are conductive. The relay bus bar 111 and the connection bus bars 112, 113 are an example of the conductive member unit.

The relay bus bar 111 has its one end connected to the projecting portion of the terminal plate 102 of the fuel cell stack 100a. The relay bus bar 111 extends from the terminal plate 102 side through the opening 15a of the stack case 10a and an opening 781a of the lid 70, described later, and extends above a bottom wall 73 of the lid 70 from the stack case 10a side to the stack case 10b side. The relay bus bar 111 has the other end connected to the projecting portion of the terminal plate 101 of the fuel cell stack 100b through an opening 781b of the lid 70, described later, and an opening 15a of the stack case 10b. The plurality of single cells 106 of the fuel cell stack 100a and the plurality of single cells 106 of the fuel cell stack 100b are thus electrically connected in series with each other by the relay bus bar 111.

The connection bus bar 112 has its one end connected to the projecting portion of the terminal plate 102 of the fuel cell stack 100b. The connection bus bar 112 extends from the terminal plate 102 side to the converter case 40 side through the openings 15a, 781b and an opening 56. The connection bus bar 112 has the other end connected to the boost converter 500. The connection bus bar 113 has its one end connected to the projecting portion of the terminal plate 101 of the fuel cell stack 100a. The connection bus bar 113 extends from the terminal plate 101 side to the converter case 40 side through the openings 15a, 781a, and 56. The connection bus bar 113 has the other end connected to the boost converter 500. The plurality of single cells 106 of the fuel cell stack 100a and the plurality of single cells 106 of the fuel cell stack 100b are thus electrically connected to the boost converter 500 by the connection bus bars 112, 113. The other ends of the connection bus bars 112, 113 and the boost converter 500 are connected by a conductive member, not shown, such as a bus bar or a cable. The boost converter 500 is composed of a plurality of electronic components such as a capacitor, an intelligent power module (IPM), a current sensor, and a reactor.

Detailed Configuration of Body 50 of Converter Case 40

The converter case 40 includes the body 50 and the lid 70. The body 50 and the lid 70 are made of a highly rigid material like a metal material such as an aluminum alloy. The lid 70 and the body 50 are placed next to each other in this order in the +Y direction. The body 50 includes side walls 51 to 54 and an upper wall 55. The side walls 51, 52 are separated from each other in the X direction and are parallel to the YZ plane. The side walls 53, 54 are separated from each other in the Z direction and are parallel to the XY plane. The upper wall 55 is parallel to the XZ plane. The length in the Z direction of each of the side walls 51, 52 is larger than that in the X direction of each of the side walls 53, 54. The side walls 51, 52 have service holes 511, 521, described later, respectively. As shown in FIGS. 1 and 4, the length in the Z direction of each of the side walls 51, 52 is smaller than the overall length in the Z direction of the stack cases 10a, 10b located next to each other in the Z direction. The length in the X direction of each of the side walls 53, 54 is substantially the same as that in the X direction of each of the side walls 13, 14 of the stack cases 10a, 10b.

The body 50 does not have a wall parallel to and facing the upper wall 55, but has the opening 56. In other words, the body 50 has a tub shape with the upper wall 55 as its bottom. The opening 56 faces the stack cases 10a, 10b via the lid 70.

The body 50 has a flange 59 around the peripheral edge of the opening 56. In other words, the flange 59 surrounds the opening 56. The flange 59 is an outward flange having a plurality of protrusions that protrude outward from the outer side surface of the flange 59 and are substantially evenly spaced apart in the circumferential direction of the flange 59. Each of the protrusions has a bolt hole, not shown. The lower end face of the flange 59 is parallel to the XZ plane. The flange 59 has a different shape from the flanges 18 of the stack cases 10a, 10b described above. Accordingly, the flanges 18 of the stack cases 10a, 10b cannot be directly fixed to the flange 59 of the body 50. The converter case 40 is an example of the second case. The flange 59 is an example of the third flange. The opening 56 is an example of the third opening.

Detailed Configuration of Lid 70 of Converter Case 40

The lengths in the X and Z directions of the lid 70 are substantially the same as those in the X and Z directions of the body 50, respectively. The lid 70 includes a peripheral wall 71, the bottom wall 73, and flanges 78a, 78b, and 79. The peripheral wall 71 has a predetermined height in the Y direction and has a generally rectangular frame shape about the Y direction. Each of the flanges 78a, 78b, and 79 has a generally rectangular frame shape. The lid 70 has the opening 781a, the opening 781b, and an opening 791 which are surrounded by the inner peripheral edges of the flanges 78a, 78b, and 79, respectively. The peripheral wall 71 continuously extends from the two flanges 78a, 78b to the flange 79. In other words, the two flanges 78a, 78b are formed at the end on the −Y direction side of the peripheral wall 71. The two flanges 78a, 78b have the same shape and size, but are denoted by different reference signs for convenience of explanation. The flanges 78a, 78b are separated from each other in the Z direction. The bottom wall 73 is formed between the adjacent flanges 78a, 78b, is continuous with the peripheral wall 71, and extends parallel to the XZ plane. The connection bus bar 112 is connected to the boost converter 500 via the opening 781b, and the connection bus bar 113 is connected to the boost converter 500 via the opening 781a. The flanges 78a, 78b are an example of the plurality of second flanges. The openings 781a, 781b are an example of the plurality of second openings. The flange 79 is an example of the fourth flange. The opening 791 is an example of the fourth opening. The bottom wall 73 is an example of an extended wall.

The flanges 78a, 78b are inward flanges like the flanges 18 of the stack cases 10a, 10b. The flange 79 is an outward flange like the flange 59 of the body 50. The lower end faces of the flanges 78a, 78b and the upper end face of the flange 79 are parallel to the XZ plane. The flange 79 is larger than the overall size of the flanges 78a, 78b. That is, the opening 791 is larger than the overall size of the openings 781a, 781b. The shape and size of the flange 79 correspond to those of the flange 59 of the body 50, and the flange 79 is an outward flange like the flange 59. The flanges 79, 59 are fastened together by bolts. The body 50 and the lid 70 are fixed together in this manner.

The flange 78a has a plurality of bolt holes that are substantially evenly spaced apart from each other in the circumferential direction of the flange 78a. The positions of the plurality of bolt holes of the flange 78a correspond to those of the plurality of internally threaded holes that are formed in the inner longitudinal ribs 185, 186 of the flange 18 of the stack case 10a, a part of the lateral rib 181 which is located between the inner longitudinal ribs 185, 186, and a part of the lateral rib 182 which is located between the inner longitudinal ribs 185, 186. The flange 78a and the flange 18 of the stack case 10a are fastened together by bolts. The lower end face of the flange 78a and the upper end face of the flange 18 thus abut on each other and are fixed together. That is, the flange 78a does not correspond to the overall shape and size of the lateral ribs 181, 182 and the outer longitudinal ribs 183, 184 which form the outermost peripheral wall of the flange 18, but corresponds to the shape and size of the peripheral wall that is defined by the inner longitudinal ribs 185, 186, the part of the lateral rib 181, and the part of the lateral rib 182. The flange 78a is fixed to the flange 18 so as to surround the opening 15a formed between the inner longitudinal ribs 185, 186. The same applies to the flange 78b and the flange 18 of the stack case 10b. With the flanges 78a, 78b fixed to the flanges 18 of the stack cases 10a, 10b, respectively, the bottom wall 73 extends so as to close the clearance between the stack cases 10a, 10b.

The stack cases 10a, 10b, the lid 70, and the body 50 are fixed together in this manner, whereby the fuel cell stacks 100a, 100b is integrated with the boost converter 500. Since the peripheral wall 71 and the bottom wall 73 of the lid 70 are continuous between the flanges 78a, 78b and the flange 79, the lid 70 together with the body 50 and the stack cases 10a, 10b forms an outer wall of a case for the entire fuel cell unit 1. These cases can thus be combined together and sealed. The body 50 and the lid 70 may be formed as a single-piece member. However, in view of ease of mounting of the electronic components of the boost converter 500, the relay bus bar 111, etc., it is preferable that the body 50 and the lid 70 be separate members. It is preferable to place a rubber gasket or a liquid gasket for improving sealing properties between the end faces of the flanges which are fixed together.

Rigidity of Stack Cases 10a, 10b

As shown in FIG. 3, the plurality of single cells 106 are stacked in the X direction, and a compressive load in the X direction is applied between the end plate 12a and the pressure plate 105 by the spring 109. The end plate 12a is fixed to the stack case 10a, and the spring 109 is disposed between the pressure plate 105 and the side wall 11 of the stack case 10a. Accordingly, the plurality of single cells 106 is subjected to the compressive load in the X direction, but the stack case 10a is subjected to a tensile load in the X direction. In other words, the stack case 10a serves as a member for retaining the compressive load applied to the plurality of single cells 106. For example, when the stack case 10a has low rigidity, the stack case 10a is extended in the X direction, and a sufficient compressive load cannot be applied to the plurality of single cells 106. In this case, conductive properties between the single cells 106 may be reduced. In the present embodiment, as shown in FIG. 2, the flange 18 of the stack case 10a has the four longitudinal ribs extending in the X direction, namely the outer longitudinal ribs 183, 184 and the inner longitudinal ribs 185, 186. Accordingly, the stack case 10a has sufficient rigidity against the load in the X direction. A sufficient compressive load can therefore be applied to the plurality of single cells 106. The same applies to the stack case 10b.

Especially in the present embodiment, the stack case 10a has the opening 15a, and reduction in rigidity of the stack case 10a due to the opening 15a is compensated for by the outer longitudinal ribs 183, 184 and the inner longitudinal ribs 185, 186. As shown in FIG. 3, the opening 15a is long in the X direction so as not to interfere with the terminal plates 102, 103, the relay bus bar 111, and the connection bus bar 113. Since the stack case 10 has such a large opening 15a, the stack case 10a tends to have reduced rigidity. However, the outer longitudinal ribs 183, 184 and the inner longitudinal ribs 185, 186 increase the rigidity of the stack case 10a, so that the stack case 10a has necessary rigidity. The same applies to the stack case 10b.

The flange 78a is connected to the inner longitudinal ribs 185, 186 located closest to the opening 15a out of the outer longitudinal ribs 183, 184 and the inner longitudinal ribs 185, 186 of the flange 18 of the stack case 10a. Since the inner longitudinal ribs 185, 186 are connected to the flange 78a, the inner longitudinal ribs 185, 186 and the flange 78a are combined together, whereby rigidity of the inner longitudinal ribs 185, 186 is further increased. Since the rigidity of the inner longitudinal ribs 185, 186 located closest to the opening 15a that can cause reduction in rigidity of the stack case 10a is thus increased, the rigidity of the stack case 10a is more effectively increased.

In the present embodiment, as shown in FIGS. 2 and 3, the opening 15a extends in the X direction along substantially the entire length of the upper wall 15. For example, one possible way to increase rigidity is to form in the upper wall 15 separate minimum required openings that expose the terminal plates 102, 103. In this case, however, it may be difficult to insert the fuel cell stack 100a into the stack case 10a in the manufacturing process of the fuel cell unit 1. Specifically, in the manufacturing process of the fuel cell unit 1, the fuel cell stack 100a assembled in advance is inserted into the stack case 10a in the +X direction. However, in the case where the upper wall 15 has only two minimum required openings as described above, the projecting portion of the terminal plate 101 and the upper wall 15 may interfere with each other during insertion of the fuel cell stack 100a into the stack case 10a, making it difficult to insert the fuel cell stack 100a into the stack case 10a. The stack case 10a is molded by casting or die casting. Accordingly, forming two openings in the upper wall 15 of the stack case 10a requires a mold with a more complicated structure, which may increase the manufacturing cost of the stack case 10a. In the present embodiment, the opening 15a extends in the X direction. Accordingly, the fuel cell stack 100a is more easily inserted into the stack case 10a, and the manufacturing cost is reduced.

Reduction in Size of Converter Case 40

As shown in FIGS. 1 and 4, the length in the Z direction of the converter case 40 is smaller than the overall length in the Z direction of the stack cases 10a, 10b disposed next to each other in the Z direction. The converter case 40 is separated from the outer longitudinal rib 183 of the stack case 10a and the outer longitudinal rib 184 of the stack case 10b and is fixed to the inner longitudinal ribs 185, 186 of the stack cases 10a, 10b. In other words, the converter case 40 is located inward of the outer longitudinal rib 183 of the stack case 10a, and is located inward of the outer longitudinal rib 184 of the stack case 10b. The overall size of the fuel cell unit 1 is thus reduced.

The size in the Y direction of the converter case 40 is also smaller than that in the Y direction of each of the stack cases 10a, 10b, and the size in the X direction of the converter case 40 is substantially the same as that in the X direction of each of the stack cases 10a, 10b. The overall size of the fuel cell unit 1 is thus reduced. The outer longitudinal rib 183 of the stack case 10a and the outer longitudinal rib 184 of the stack case 10b are located at one end and the other end of all of the outer longitudinal ribs 183, 184 and the inner longitudinal ribs 185, 186 of the flanges 18 of the stack cases 10a, 10b which are located next to each other in the Z direction. That is, the outer longitudinal rib 183 of the stack case 10a and the outer longitudinal rib 184 of the stack case 10b are the two outermost ribs of the plurality of ribs of the stack cases 10a, 10b in a second direction crossing the direction in which the single cells 106 are stacked.

Use of Same Stack Case 10a in Different Fuel Cell Unit

Figure 5:
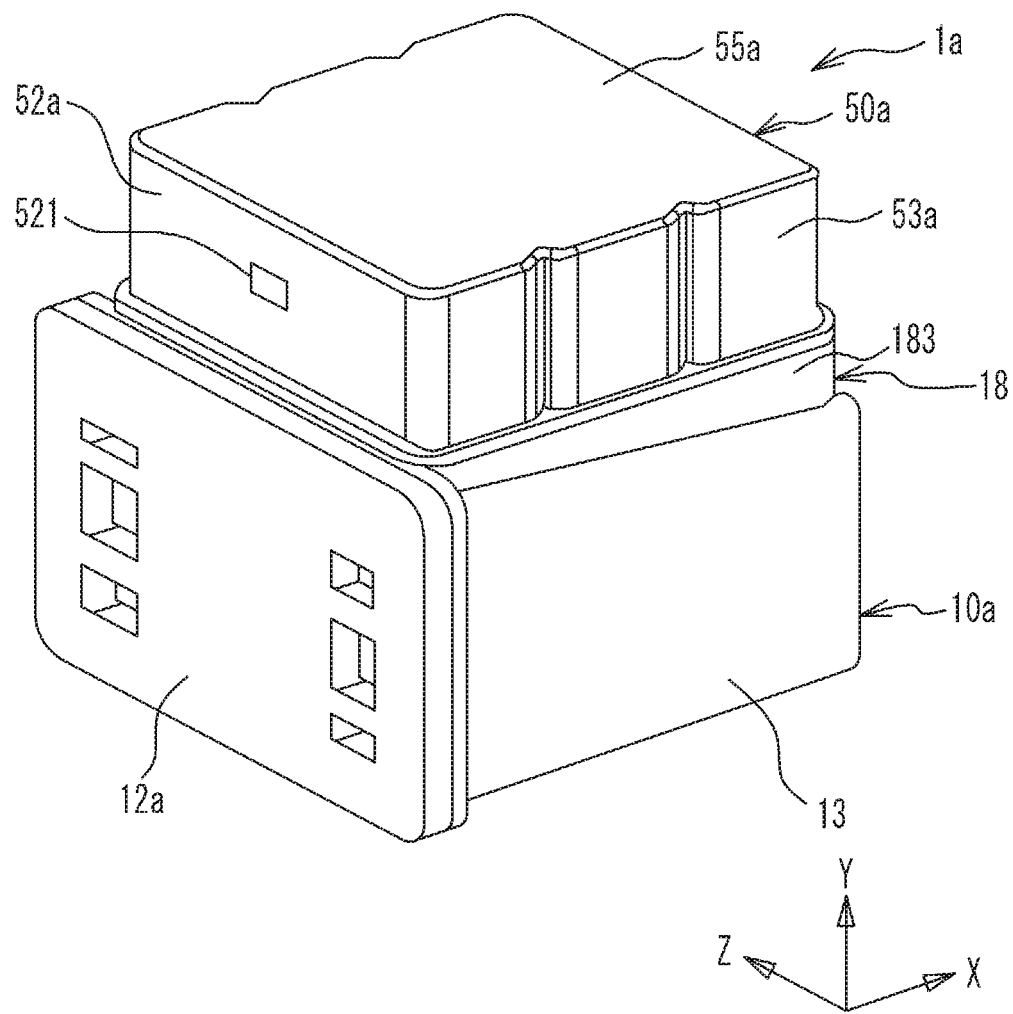
FIG. 5 is a perspective view showing the appearance of a fuel cell unit.
Figure 6:
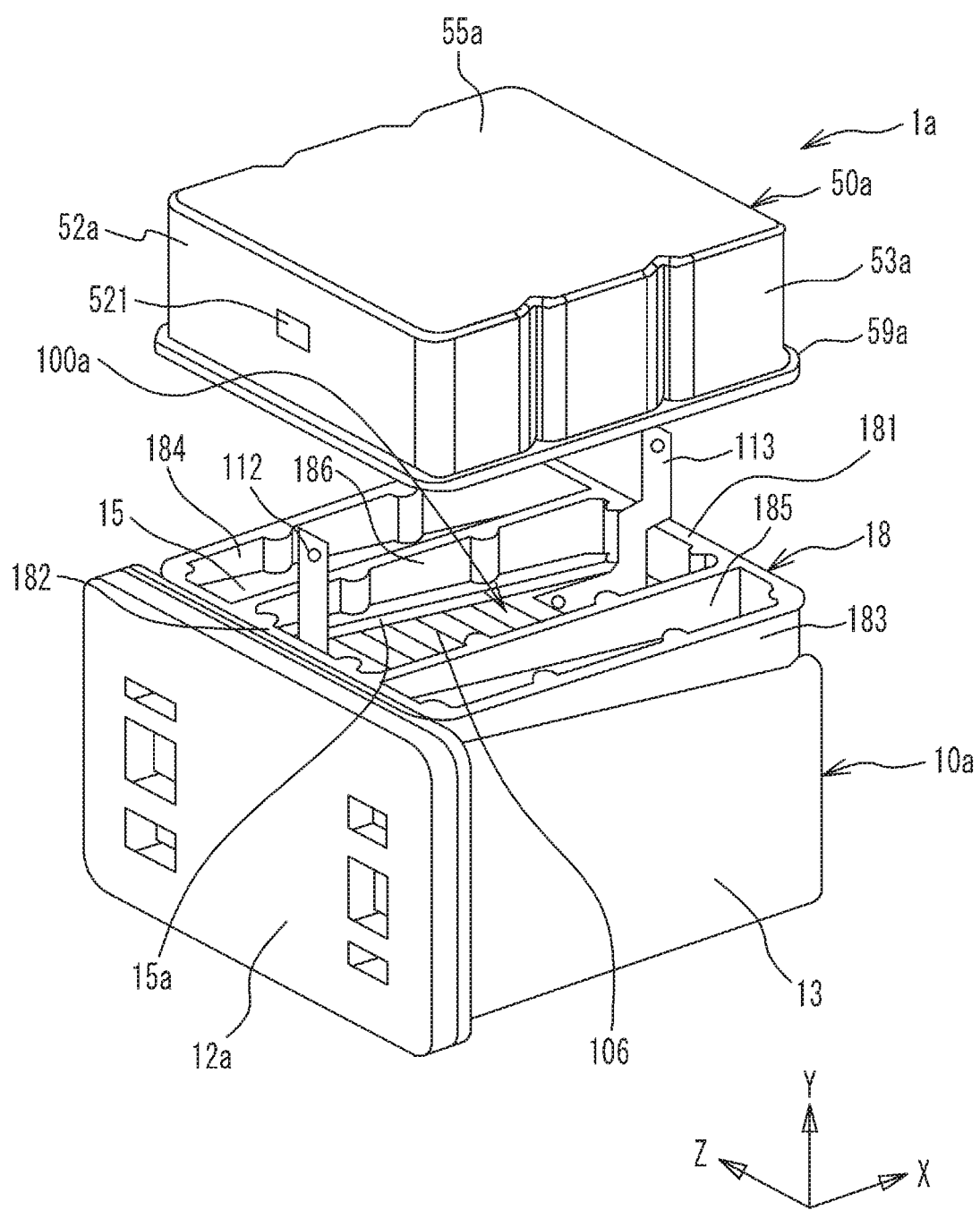
FIG. 6 is an exploded perspective view of the fuel cell unit.

FIG. 5 is a perspective view showing the appearance of a fuel cell unit 1a. FIG. 6 is an exploded perspective view of the fuel cell unit 1a. Regarding the fuel cell unit 1a, the same or similar configurations as those of the fuel cell unit 1 are denoted by the same or similar reference signs, and description thereof will not be repeated. The fuel cell unit 1a includes the stack case 10a used in the fuel cell unit 1, the fuel cell stack 100a accommodated in the stack case 10a, and a converter case 50a different from the converter case 40, and a boost converter, not shown, accommodated in the converter case 50a. The converter case 50a is smaller than the converter case 40, and the boost converter accommodated in the converter case 50a is also smaller than the boost converter 500. The boost converter accommodated in the converter case 50a is a boost converter for the single fuel cell stack 100a, and the size of the components of the boost converter such as a reactor is smaller than in the boost converter 500. The stack 107 of the fuel cell stack 100a is electrically connected to the boost converter by the terminal plates 101, 102 and the connection bus bars 112, 113.

A side wall 52a of the converter case 50a and a side wall, not shown, of the converter case 50a which faces the side wall 52a and which is separated in the X direction from, and parallel to, the side wall 52a, have substantially the same size in the Z direction as the stack case 10a. A side wall 53a of the converter case 50a and a side wall, not shown, of the converter case 50a which faces the side wall 53a and which is separated in the Z direction from, and parallel to, the side wall 53a have substantially the same size in the X direction as the stack case 10a. A flange 59a of the converter case 50a is an inward flange and is directly fixed to the lateral ribs 181, 182 and the outer longitudinal ribs 183, 184 of the flange 18. By using the outer longitudinal ribs 183, 184 that are not used in the fuel cell unit 1, the converter case 50a accommodating the boost converter for the single fuel cell stack 100a can be fixed to the single stack case 10a. The stack case 10a used for the fuel cell unit 1 can thus also be used for the fuel cell unit 1a. The manufacturing cost of the fuel cell stack 100a and the fuel cell unit 1a is therefore reduced. Since the stack case 10b is the same member as the stack case 10a as described above, the manufacturing cost of the fuel cell unit 1 is also reduced.

The flange 59a of the converter case 50a is not limited to being connected to the lateral ribs 181, 182 and the outer longitudinal ribs 183, 184. For example, the flange 59a may be fixed to a frame-shaped region defined by the lateral ribs 181, 182, the outer longitudinal rib 184, and the inner longitudinal rib 185 or a frame-shaped region defined by the lateral ribs 181, 182, the outer longitudinal rib 183, and the inner longitudinal rib 186 so as to surround the opening 15a of the stack case 10a. Since the stack case 10a has not only the outer longitudinal ribs 183, 184 but also the plurality of inner longitudinal ribs 185, 186, a plurality of converter cases having different sizes can be fixed to the stack case 10a.

Others

The converter case 40 of the fuel cell unit 1 shown in FIGS. 1 to 4 may be fixed to any of the ribs except for the outer longitudinal rib 183 of the stack case 10a. In this case, the flange 78b of the converter case 40 may be fixed to a frame-shaped region defined by the lateral ribs 181, 182, the outer longitudinal rib 184, and either the outer longitudinal rib 183 or the inner longitudinal rib 185 of the stack case 10b so as to surround the opening 15a of the stack case 10b. The converter case 40 may be fixed to any of the ribs except for the outer longitudinal rib 184 of the stack case 10b. In this case, the flange 78a of the converter case 40 may be fixed to a frame-shaped region defined by the lateral ribs 181, 182, the outer longitudinal rib 183, and either the outer longitudinal rib 184 or the inner longitudinal rib 186 of the stack case 10a so as to surround the opening 15a of the stack case 10a.

The flange 78a of the converter case 40 of fuel cell unit 1 is fixed to the frame-shaped region defined by the lateral ribs 181, 182 and the inner longitudinal ribs 185, 186 of the flange 18 of the stack case 10a. However, the disclosure is not limited to this. For example, the flange 78a may be fixed to a frame-shaped region defined by the lateral ribs 181, 182, the outer longitudinal rib 184, and the inner longitudinal rib 185 of the stack case 10a. Similarly, the flange 78b of the converter case 40 of the fuel cell unit 1 may be fixed to a frame-shaped region defined by the lateral ribs 181, 182, the outer longitudinal rib 183, and the inner longitudinal rib 186 of the stack case 10b.

The opening 15a of the stack case 10a is formed between the inner longitudinal ribs 185, 186. However, the disclosure is not limited to this. The opening 15a of the stack case 10a may be formed between, e.g., the outer longitudinal rib 184 and the inner longitudinal rib 186 as long as the fuel cell stacks 100a, 100b can be electrically connected to the boost converter 500. In this case, the flange 78a may be fixed to a frame-shaped region defined by the lateral ribs 181, 182, the outer longitudinal rib 184, and the inner longitudinal rib 185 or 186 so as to surround the opening 15a. Similarly, the opening 15a of the stack case 10b may be formed between, e.g., the outer longitudinal rib 183 and the inner longitudinal rib 185. In this case, the flange 78b may be fixed to a frame-shaped region defined by the lateral ribs 181, 182, the outer longitudinal rib 183, and the inner longitudinal rib 185 or 186 so as to surround the opening 15a.

The stack cases 10a, 10b are not limited to the members having the same shape and size. For example, the opening 15a of the stack case 10a may be formed between the outer longitudinal rib 184 and the inner longitudinal rib 186 as described above, and the opening 15a of the stack case 10b may be formed between the inner longitudinal ribs 185, 186 as shown in FIG. 2 or may be formed between the outer longitudinal rib 183 and the inner longitudinal rib 185 as described above. The opening 15a of the stack case 10a may be formed between the inner longitudinal ribs 185, 186 as shown in FIG. 2, and the opening 15a of the stack case 10b may be formed between the outer longitudinal rib 183 and the inner longitudinal rib 185 as described above.

The flange 18 includes a total of four ribs extending in the X direction, that is, the outer longitudinal ribs 183, 184 and the inner longitudinal ribs 185, 186. However, the flange 18 need only include three or more ribs extending in the X direction. For example, the inner longitudinal rib 186 may be omitted from the flange 18 of the stack case 10a. In this case, the flange 78a of the lid 70 of the fuel cell unit 1 may be fixed to a frame-shaped region defined by the lateral ribs 181, 182, the outer longitudinal rib 184, and the inner longitudinal rib 185 of the flange 18 of the stack case 10a. Similarly, the inner longitudinal rib 185 may be omitted from the flange 18 of the stack case 10b. In this case, the flange 78b of the lid 70 of the fuel cell unit 1 may be fixed to a frame-shaped region defined by the lateral ribs 181, 182, the outer longitudinal rib 183, and the inner longitudinal rib 186 of the flange 18 of the stack case 10b.

In the fuel cell unit 1, the fuel cell stacks 100a, 100b are electrically connected in series with each other by the relay bus bar 111. However, the disclosure is not limited to this. For example, the two fuel cell stacks 100a, 100b may be electrically connected in parallel to the boost converter that is a power converter by a connection bus bar.

The converter case 40 of the fuel cell unit 1 is composed of the tub-shaped body 50 and the frame-shaped lid 70. However, the disclosure is not limited to this. For example, the outer longitudinal rib 184 of the stack case 10a and the outer longitudinal rib 183 of the stack case 10b, which are located adjacent to each other in the Z direction, may be in contact with each other, the entire upper end faces of the flanges 18 of the stack cases 10a, 10b may be located on the same XZ plane, and these upper end faces may be directly fixed to the lower end face of the flange 59 of the body 50. This configuration reduces the number of components required. In this case, the flange 59 of the body 50 needs to be changed to an inward flange so as to correspond to the flange 18. The flange 59 may be located inward of both the outer longitudinal rib 183 of the stack case 10a and the outer longitudinal rib 184 of the stack case 10b, may not be fixed to the outer longitudinal rib 184 of the stack case 10a and the outer longitudinal rib 183 of the stack case 10b, and may be fixed to a frame-shaped area defined by the inner longitudinal rib 185 of the stack case 10a, the inner longitudinal rib 186 of the stack case 10b, and the lateral ribs 181, 182 of the stack cases 10a, 10b. In this case, the opening 56 of the body 50 is an example of the second opening.

The stack case 10a applies a compressive load in the X direction to the stack 107 via the spring 109. However, the disclosure is not limited to this. For example, a compressive load in the X direction may be applied to the stack 107 with the pressure plate 105 being in direct contact with the side wall 11 of the stack case 10a with no spring 109 therebetween and with the end plate 12a being fixed to the stack case 10a. Alternatively, an adjusting screw may be provided on the side wall 11, and a compressive load in the X direction may be applied to the stack 107 using the adjusting screw. In this case, the amount by which the adjusting screw projects from the side wall 11 toward the pressure plate 105 varies depending on how much the adjusting screw is turned, and a compressive load in the X direction is applied to the stack 107 by pressing the pressure plate 105 toward the end plate 12a fixed to the stack case 10a by the adjusting screw. In either case, a compressive load in the X direction is applied to the stack 107 by the stack case 10a.

The fuel cell unit 1 may be mounted on a vehicle etc. with the bottom walls 16 of the stack cases 10a, 10b facing downward in the direction of gravity. However, the fuel cell unit 1 may be mounted on a vehicle etc. in other orientations. For example, the fuel cell unit 1 may be mounted on a vehicle etc. with the end plates 12a of the stack cases 10a, 10b facing downward in the direction of gravity. In this case, liquid water is more easily drained from the fuel cell stacks 100a, 100b, so that flooding during power generation and freezing of residual water in the fuel cell stacks 100a, 100b after power generation is stopped can be prevented. Accordingly, the power generation capability of the fuel cell stacks 100a, 100b is less likely to be reduced. The fuel cell unit 1 may be mounted on a vehicle etc. with the upper wall 55 of the body 50 facing downward in the direction of gravity. The same applies to the fuel cell unit 1a.

In the fuel cell unit 1, the converter case 40 is fixed to the two stack cases 10a, 10b. However, the disclosure is not limited to this. For example, a single converter case may be fixed to three or more stack cases. In this case, with the three or more stack cases being disposed next to each other in, e.g., the Y direction, the converter case need only be located inward of at least one of a rib region located at one end of a plurality of rib regions of these stack cases which extend in the X direction and a rib region located at the other end of the plurality of rib regions.

Although the embodiments of the disclosure are described in detail above, the disclosure is not limited to such specific embodiments, and various modifications and variations can be made.

What is claimed is:

1. A fuel cell unit, comprising:
   a plurality of fuel cell stacks;
   a plurality of first cases each accommodating a corresponding one of the fuel cell stacks;
   a power converter that converts electric power of the fuel cell stacks;
   a second case accommodating the power converter and fixed to the first cases; and
   a conductive member unit that electrically connects the fuel cell stacks to the power converter in the first cases and the second case, wherein:
   each of the fuel cell stacks includes a stack including a plurality of single cells stacked in a first direction;
   the stack is subjected to a compressive load in the first direction applied by a corresponding one of the first cases;
   each of the first cases includes a wall facing the second case, a first flange projecting from the wall toward the second case, and a first opening formed in the wall so as to be surrounded by the first flange;
   the second case includes a second flange fixed to the first flanges of the first cases so as to surround the first openings of the first cases, and a second opening formed so as to be surrounded by the second flange and communicating with the first openings;
   the conductive member unit extends from each of the first openings through the second opening into the second case;
   each of the first flanges includes at least three ribs extending in the first direction and located next to each other in a second direction crossing the first direction;
   the first cases are arranged such that the at least three ribs of each of the first cases extend in the first direction and are located next to each other in the second direction;
   a length of the second case in the second direction is smaller than an overall length of the first cases in the second direction; and
   the second flange is separated from at least one of the ribs located at a first end and a second end, out of the at least three ribs of the first cases which are located next to each other in the second direction, and is fixed to two of the at least three ribs except for the at least one of the ribs.

2. The fuel cell unit according to claim 1, wherein the at least three ribs include at least four ribs, and
   the second flange is separated from both of the ribs located at the first end and the second end, out of the at least four ribs of the first cases which are located next to each other in the second direction, and is fixed to two of the at least four ribs except for the both of the ribs.

3. The fuel cell unit according to claim 1, wherein the second flange is fixed to the rib located closest to the first opening in at least one of the first cases.

4. The fuel cell unit according to claim 1, wherein:
   the stack includes first and second terminal plates between which the single cells are sandwiched and that are separated from each other in the first direction;
   the first opening has a shape that is longer in the first direction than in the second direction; and
   the conductive member unit includes first and second conductive members connected to the first and second terminal plates through the first opening, respectively.

5. The fuel cell unit according to claim 1, wherein the second case includes a plurality of the second flanges each fixed to a corresponding one of the first flanges of the first cases, and a plurality of the second openings each surrounded by a corresponding one of the second flanges.

6. The fuel cell unit according to claim 5, wherein:
   the second case includes a tub-shaped body and a lid fixed to the tub-shaped body;
   the tub-shaped body includes a third flange and a third opening surrounded by the third flange;
   the lid includes the second flanges, the second openings, a fourth flange fixed to the third flange, and a fourth opening surrounded by the fourth flange; and
   each of the third and fourth flanges is larger than the second flange.

* * * * *